(12) United States Patent
Gomez-Uribe et al.

(10) Patent No.: US 9,129,214 B1
(45) Date of Patent: Sep. 8, 2015

(54) PERSONALIZED MARKOV CHAINS

(71) Applicant: NETFLIX, INC., Los Gatos, CA (US)

(72) Inventors: Carlos Gomez-Uribe, Los Gatos, CA (US); Vijay Bharadwaj, Los Gatos, CA (US); Antonio Molins Jiménez, San Francisco, CA (US)

(73) Assignee: Netflix, Inc., Los Gatos, CA (US)

( * ) Notice: Subject to any disclaimer, the term of this patent is extended or adjusted under 35 U.S.C. 154(b) by 253 days.

(21) Appl. No.: 13/829,064

(22) Filed: Mar. 14, 2013

(51) Int. Cl.
*G06F 17/00* (2006.01)
*G06N 5/02* (2006.01)

(52) U.S. Cl.
CPC ........................................ *G06N 5/02* (2013.01)

(58) Field of Classification Search
None
See application file for complete search history.

(56) References Cited

U.S. PATENT DOCUMENTS

2008/0313168 A1* 12/2008 Liu et al. ............................ 707/5
2010/0280985 A1* 11/2010 Duchon et al. ................. 706/52

OTHER PUBLICATIONS

Hoi et al. "Semi-Supervised Ensemble Ranking", AAAI, 2008, pp. 634-639.*

* cited by examiner

*Primary Examiner* — Li-Wu Chang
(74) *Attorney, Agent, or Firm* — Hickman Palermo Becker Bingham LLP

(57) ABSTRACT

In an approach, a method comprises receiving title interaction data, wherein the title interaction data specifies, an order in which users interacted with a plurality of titles; generating a plurality of statistical models, each statistical model of the plurality of statistical models specifying a plurality of probabilities, wherein the plurality of probabilities represent, for each first title of the plurality of titles and each second title of the plurality of titles, a likelihood that a user will interact with the first title then next interact with the second title; refining the plurality of statistical models based on the title interaction data; determining a plurality of weight values corresponding to the plurality of statistical models for a particular user; identifying, for the particular user, one or more recommended titles of the plurality of titles based on the plurality of weight values and the plurality of statistical models.

18 Claims, 7 Drawing Sheets

PERSONALIZED MARKOV CHAINS

TECHNICAL FIELD

The present disclosure generally relates to computer-based techniques for generating personalized Markov chains useful in various kinds of computer recommendation systems. The present disclosure relates more specifically to techniques for recommending titles of content items based on personalized Markov chains.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital Content Distribution Systems

Digital content distribution systems often include a content server, an application, a content player, and a communications network connecting the content server to the content player. The content server is configured to store digital content items corresponding to different content titles that can be downloaded from the content server to the content player. The application allows a user of the content player to browse through available digital content, manage account information, rate digital content items, etc.

Digital content distribution systems offer a large variety of digital media to the user for viewing. To enhance the user experience, content distribution systems may provide personal digital media recommendations to the individual user. One approach to recommending digital media involves determining digital media of interest to the individual user based on the preferences of similar users using collaborative filtering or related techniques. One drawback of this approach however, is that a large amount of data needs to be stored and managed in order to determine similar users, making such an approach inappropriate in some situations.

Another approach is to identify digital media that is similar to digital media previously viewed by the user. One implementation of such a recommendation system may involve attaching metadata tags to digital media, such that digital media having the same metadata tags are deemed to be similar. However, given the large variety of digital media available, thousands of metadata tags are needed to accurately describe the contents of digital media.

Managing the metadata tags and performing similarity computations based on the multitude of tags usually needs large amounts of processing power and storage space. In addition, because metadata tags are often attached to digital media based on the perceptions of an individual, the tags may not accurately describe the contents of the digital media, and, therefore, any similarity computation performed based on the tags may not be accurate. Further, the set of metadata tags that optimally determine similarity of digital media and/or the extent to which each tag should contribute to this similarity typically varies depending on the actual content being evaluated, making global scoring functions based on metadata tags sub-optimal, and content specific ones difficult to estimate.

Markov Chains

A Markov chain is a mathematical system that undergoes state transitions. In many cases, a Markov chain represents a discrete-time process involving a system which is in a certain state at each step, with the state changing randomly between the steps. The steps may represent moments in time, but can refer also to physical distance, number of iterations, or any other discrete measurement. The Markov property states that the conditional probability distribution for the system at the next step (and all future steps) depends only on the current state of the system, and not additionally on the state of the system at previous steps.

Often Markov chains are described by Markov matrices, in which each entry specifies the probability of transitioning from one state to another state during the next step. The example Markov matrix below describes a Markov chain with three states (1, 2, 3) where the probability $p_{i,j}$ of transitioning from state i to state j during the next step is given by the corresponding entry in the matrix:

| | | |
|---|---|---|
| $p_{1,1}$ | $p_{1,2}$ | $p_{1,3}$ |
| $p_{2,1}$ | $p_{2,2}$ | $p_{2,3}$ |
| $p_{3,1}$ | $p_{3,2}$ | $p_{3,3}$ |

Since the system will always transition from state i to at least some state j during each time step, the sum of the probabilities in each row of a Markov matrix is always equal to 1 (100% probability). For convenience, the techniques described herein will assume that Markov chains are represented by Markov matrices. However, the exact structure used to represent Markov chains is not critical to the techniques described herein.

DETAILED DESCRIPTION

Figure 1:
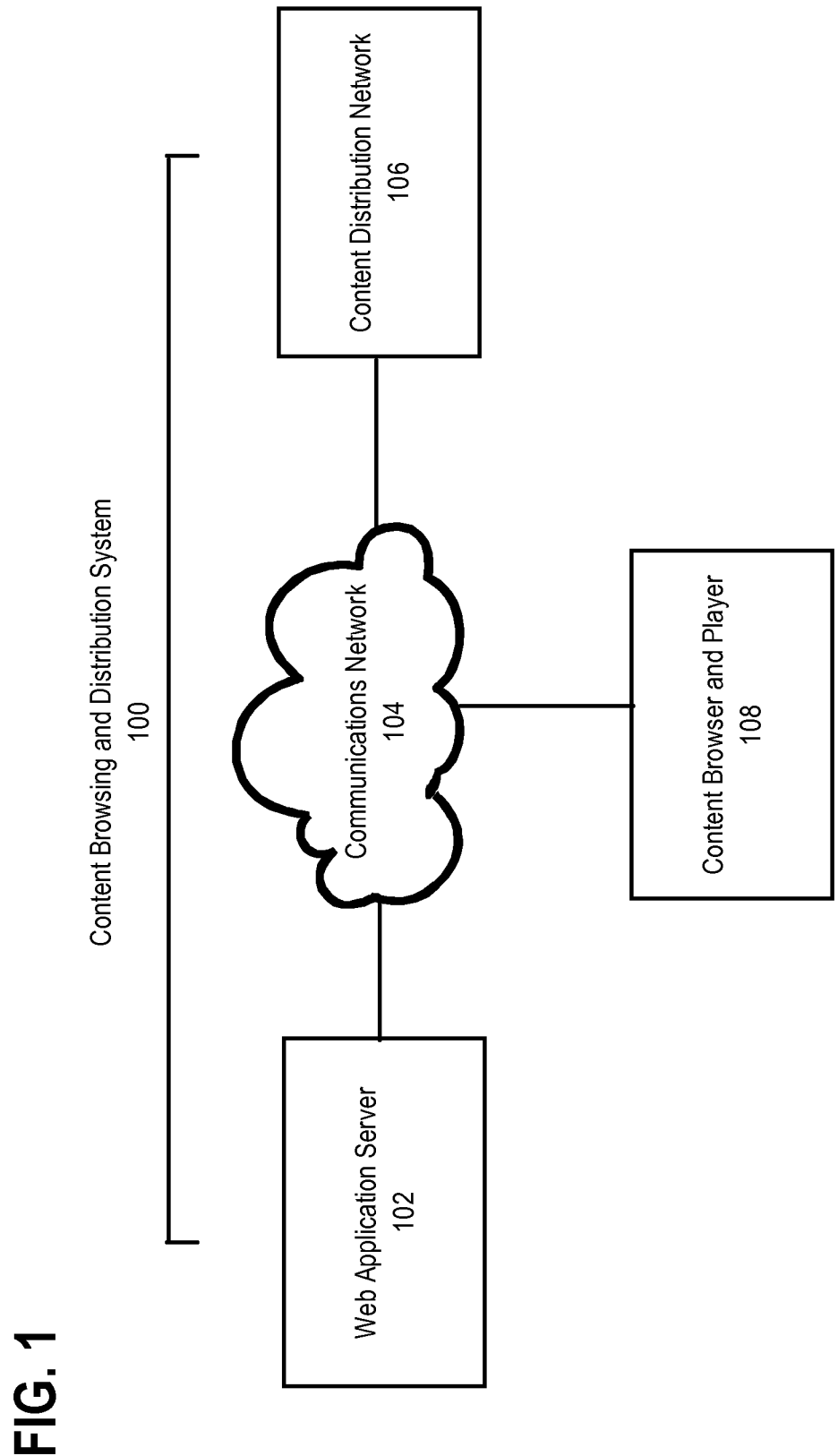
FIG. 1 illustrates, in block diagram form, an example operating environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
3.0 Personalized Model Generator Functional Overview
4.0 Similars Generator Functional Overview 5.0 Recommendation Engine Functional Overview
6.0 Title Recommendation Display
7.0 Optimizing Computation of Similars
8.0 Alternative Contexts and Uses
9.0 Hardware Overview
10.0 Extensions and Alternatives 1.0 GENERAL OVERVIEW Another approach to recommending digital content is described in application Ser. No. 13/590,071, filed Aug. 20, 2012, titled "Identifying Similar Items Based on Interaction History", by Gomez Uribe et al. (the '071 Application), which is hereby incorporated by reference for all purposes as though fully stated herein. According to one technique described by the '071 Application, a recommendation engine generates a Markov chain based on recorded user interactions with digital content items. For convenience, the term "digital content item" will be used interchangeably with the term 'title'. The transition probabilities of the Markov chain represent the likelihood that a user who has selected title i will next select title j. The recommendation engine then calculates, from the Markov chain, one or more measurements of similarity ("similars") between the titles. When a user watches a particular title, the similars are used to rank and display titles that the user will likely interact with next.

However, when a single Markov chain is used to generate the similars for all users, the recommendation engine implicitly assumes that all users are guided by the same stochastic process. That is, each user is assumed to have the same probability upon selecting title i of next selecting title j. In a practical environment, this is rarely the case. Often, users will have unique preferences that make selecting a next title j more or less likely. As a result, personalized Markov chains tailored to individual users or groups of users can potentially produce very accurate similars and title recommendations. For example, a single Markov chain calculated with data from all users can have very large transition probabilities from a superhero action title to other superhero action titles but also to superhero animation titles, yet perhaps only the former would be relevant to typical adult users while the latter only to younger users who enjoy animation titles.

Techniques for generating personalized Markov chains are described in this disclosure. In one approach, the users of the content distribution network are assumed to perform title selections based on a weighted mixture of Markov chains. For example, the Markov chains may represent the stochastic selection process of various prototypical types of users, such as fans of sci-fi, documentaries, westerns, comedies, dramas, etc. A user who often selects drama titles but also occasionally selects sci-fi titles may be modeled as a weighted mixture of the two Markov chains for sci-fi prototypical users and for drama-loving users. The Markov chains may also represent age groups, regional preferences, or any other type of demographic. For example, a user may represent an account on a content distribution network that is shared across a household. As a result, the user may be modeled as a weighted mixture of Markov chains corresponding to the demographics of the household's individuals. However, the Markov chains utilized by the techniques herein are not required to correspond to "recognizable" demographics or genres, and may simply represent various distributions over transitions from a current title i to a next title j. In fact, in some embodiments, the techniques described herein automatically learn from user data what the prototypical Markov chains are across the entire population of users using only title selection data, e.g., completely independently of title metadata or user demographics.

The approach above posits that each user's title selection process can be represented by a mixture of a fixed set of c Markov chains and that each transition from title i to title j performed by a user is attributable to one of the c Markov chains. Each transition performed by a user is assumed to have been produced according to the following generative model. For each user, select the weights of each of the c Markov chains according to a Dirichlet distribution that is shared across all users in the data set. To generate a sequence of titles played by the user, starting from the first title, first pick one of c Markov chains according to the user's chosen weights and then pick the next title according to the transition probabilities from the chosen Markov Chain.

Working backwards from the assumed model and a recorded collection of transitions performed by the users, a web application server jointly discovers the Markov chains shared across the entire user population, the underlying distribution of Markov chain weights that is shared across the entire user population in the data set, and the distribution of likely mixture weights for each user that is likely to explain the recorded collection of transitions for that user. The resulting c Markov chains, along with the per-user mixtures then provide the building blocks for a personalized Markov chain tailored to a particular user's title selection process. The web application server is then able to use the personalized Markov chain to generate similars and provide title recommendations for the particular user.

However, when the number of users is very large, computing the similars from the personalized Markov chain for every single user of a content distribution system may require a great deal of computational resources. Thus, in another approach, the similars are computed for each of the c Markov chains ranking titles using a score which is a function of the transition probability matrix of the chain being considered. To generate title recommendations for a user, the web application server combines the similars of each Markov chain by weighing the corresponding scores in accordance with that user's Markov chain mixture, effectively replacing a computationally intensive score derived from a per-user mixture of Markov Chains by using the per-user average of the per-chain scores. The web application server then generates title recommendations for that user based on the weighted combination of similars. As a result, the similars are only computed for each Markov chain of the set, which in many cases, e.g., when the number of Markov chains is much smaller than the number of users, will be faster than computing the similars from each user's personalized Markov chain.

In an embodiment, a method comprises receiving title interaction data, wherein the title interaction data specifies, for each user of a plurality of users, an order in which the user interacted with a plurality of titles; generating a plurality of statistical models, each statistical model of the plurality of statistical models specifying a plurality of probabilities, wherein the plurality of probabilities represent, for each first title of the plurality of titles and each second title of the plurality of titles, a likelihood that a user will interact with the first title then next interact with the second title; refining the plurality of statistical models based on the title interaction data; determining a plurality of weight values corresponding to the plurality of statistical models for a particular user of the plurality of users; identifying, for the particular user, one or more recommended titles of the plurality of titles based on the plurality of weight values and the plurality of statistical models; wherein the method is performed by one or more computing devices.

In other embodiments, the invention encompasses a computer apparatus and a computer-readable medium configured to carry out the foregoing steps.

2.0 EXAMPLE OPERATING ENVIRONMENT

FIG. 1 illustrates, in block diagram form, an example operating environment upon which an embodiment may be implemented. In FIG. 1, a content browsing and distribution system 100 includes a web application server 102, a communications network 104, a content distribution network (CDN) 106 and a content browser and player (CBP) 108. For convenience, only a particular number of each of the aforementioned elements is depicted in FIG. 1. However, a practical environment may have many more, perhaps thousands or millions, of the aforementioned elements.

The communications network 104 includes a plurality of network communication systems, such as routers and switches, configured to facilitate data communication between the web application server 102, the CDN 106 and the CBP 108. In an embodiment, communications network 104 represents any combination of one or more local networks, wide area networks, internetworks, or service provider networks. In some embodiments, communications network 104 represents the Internet. The nodes of communications network 104 may send messages using any number of protocols, such as network layer protocols (e.g. IP, MPLS, IPsec, etc.), transport layer protocols (e.g. TCP, UDP, etc.), and/or application layer protocols (e.g. FTP, SSH, TLS, HTTP, etc.). However, the exact protocol or combination of protocols used to deliver messages across communications network 104 is not critical to the techniques described herein.

The web application server 102 is a computer system configured to host a web application that is accessed by the CBP 108. In an embodiment, the web application hosted by the web application server 102 allows a user of CPB 108 to browse through available digital content, manage account information, receive content recommendations, etc.

The CDN 106 comprises one or more computer systems configured to serve download requests for digital media from the CBP 108. The digital content items may reside on a mass storage system accessible to the CDN 106. The mass storage system may include, without limitation, direct attached storage, network attached file storage, or network attached block-level storage. The digital content items may be formatted and stored on the mass storage system using any technically feasible technique. A data transfer protocol, such as HTTP, may be used to download digital content items from the CDN 106 to the CBP 108.

The CBP 108, in various embodiments, comprises a computer system, a set top box, a mobile device such as a mobile phone, user application, or any other technically feasible platform that has network connectivity and is coupled to or includes a display device and/or speaker device for presenting video frames, and generating acoustic output respectively. The CBP 108 interacts with the web application server 102 and the CDN 106 to display available digital content information, gather user preferences, play digital content items, etc.

3.0 EXAMPLE WEB APPLICATION SERVER DESIGN

Figure 2:
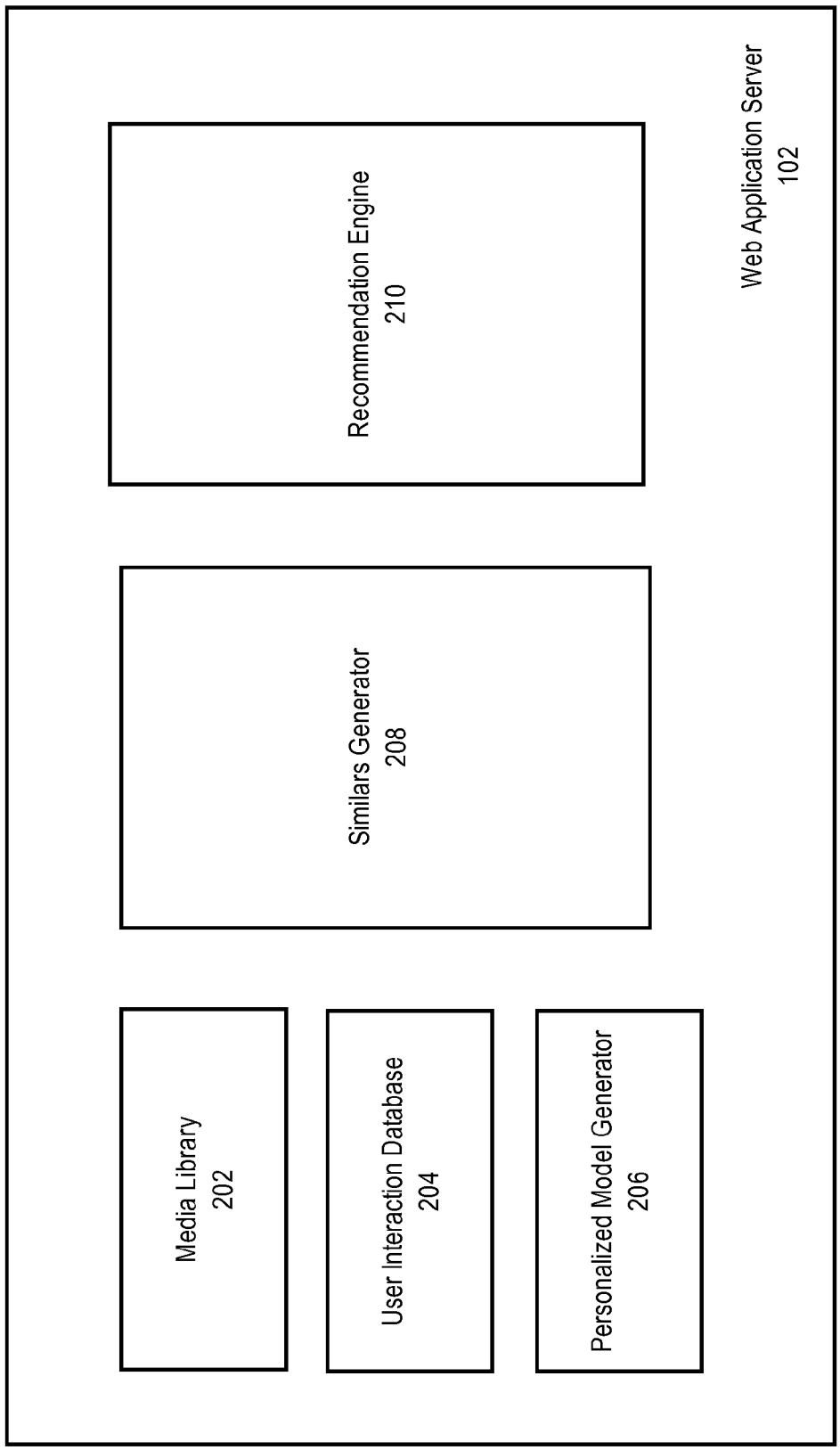
FIG. 2 illustrates, in block diagram form, a web application server according to an embodiment.

FIG. 2 is a detailed block diagram of the web application server 102 of FIG. 1, according to an embodiment. As shown, the web application server 102 includes a media library 202, a user interaction database 204, a personalized model generator 206, a similars generator 208, and a recommendation engine 210.

The media library 202 includes a list of digital content items with which users of the web application server interact. An interaction with a digital content item may include a user action on an item, such as viewing the digital content item, rating the digital content item, adding an item to a set of items of interest (such as a preference queue), searching for an item in a search engine, or even clicking or otherwise navigating to a more detailed description of an item. Any combination of different interaction types would also fit the framework described here.

Digital content items may include video data, such as movies, image data, such as photographs, or audio data, such as songs. However, the exact type of data that the digital content items represent is not critical to the techniques described herein. In an embodiment, the media library 202 includes only references to digital content items that are stored within the CDN 106 for distributions to users of the CBP 108.

The user interaction database 204 stores the interaction history related to users of the content browsing and distribution system 100. In the case of the CBP 108, each time a user interacts with a particular digital content item via the CBP 109, the interaction is recorded in the user interaction database 204. In some embodiments, along with information identifying the user and the digital content item, the records may also include the time and date of each interaction, the duration that the user interacted with the digital content item, metadata about the user such as demographical information, etc. For other types of interactions, the strength of the interaction may be stored. For example, if the interaction is a rating, then the actual rating value is stored. Based on recorded interactions, a comprehensive history of the user can be determined. For example, based on two consecutive interactions from the same user, a transition from a title i to a title j may be recorded.

The personalized model generator 206 generates, based on the interactions stored in the user interaction database 204, one or more Markov chains likely to explain the interactions recorded in the user interaction database 204. In addition, for each user, the personalized model generator 206 calculates the mixture of those Markov chains likely to explain that user's interaction history. Thus, given a particular user, the personalized model generator 206 computes, from the one or more Markov chains and the known mixture, a personalized Markov chain for the particular user. A more detailed explanation of how the personalized model generator 206 operates will be described later in Section 4.0.

The similars generator 208 identifies, for a particular title, other titles that are statistically similar to the particular title. In an embodiment, the similars generator 208 takes as input the personalized Markov chain generated by the personalized model generator 206 and the particular title. From the aforementioned inputs, the similars generator 208 computes a measurement of similarity between the particular title and other titles available on the CDN 106. A more detailed description of how the similars generator 208 computes the similars will be described later in Section 5.0.

The recommendation engine 210 recommends titles to users of the content browsing and distribution system 100, via the CBP 108, based, at least in part, on the similars computed by the similars generator 208. For example, when a user interacts with title i, the recommendation engine 210, recommends one or more titles with similarity scores to title i that are above a particular threshold. As another example, the recommendation engine 210 may recommend titles with the top N similarity scores to title i. Thus, the recommendation engine 210 presents users with recommendations of titles that are determined to be statistically similar to a title with which the user last interacted. A more detailed description of how the recommendation engine 210 recommends titles will be described later in section 6.0.

In an embodiment, the personalized model generator 206, similars generator, and recommendation engine 210 may be implemented using one or more computer programs, other software elements, firmware, or a combination thereof that are hosted in or executed by a general-purpose computer. Alternatively, web application server 102 may be configured as a special-purpose computer in which the personalized model generator 206, similars generator, and recommendation engine 210 are implemented using special-purpose logic.

4.0 PERSONALIZED MODEL GENERATOR FUNCTIONAL OVERVIEW

Figure 3:
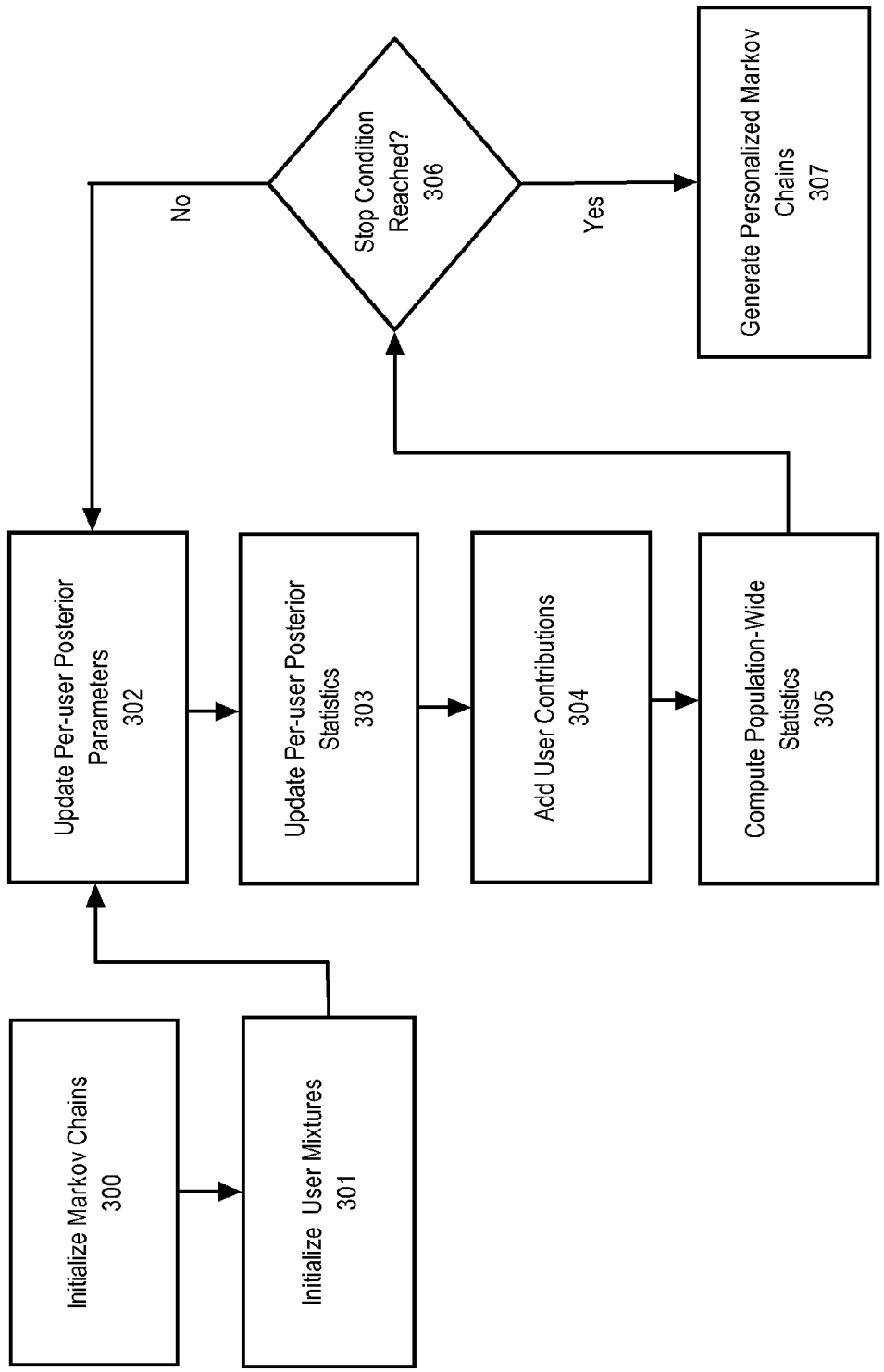
FIG. 3 illustrates, in block diagram form, a personalized model generator generating a personalized Markov chain according to an embodiment.

FIG. 3 illustrates, in block diagram form, the personalized model generator 206 generating a personalized Markov chain according to an embodiment.

At block 300, the personalized model generator 206 initializes a set of Markov chains. In an embodiment, the personalized model generator 206 generates a "global" Markov chain based on the interaction histories stored in the user interaction database 204. The personalized model generator 206 then creates the set of Markov chains from the global Markov chain by adding noise and normalizing so that the rows correspond to valid transition probabilities.

For example, the global Markov chain may be generated via the following equation:

$$P_{i,j} = \frac{\eta_{i,j}}{d_i} \quad \text{(Equation 1)}$$

where $P_{i,j}$ represents the global Markov chain (the probabilities of transitioning from title i to title j), $\eta_{i,j}$ represents the count of the transitions from i to j for the global population of users stored in the user interaction database 204, and $d_i$ represents the count of total interactions with item i stored in the user interaction database 204 for the users. The interactions that are included in the count $\eta_{i,j}$ may be weighted according to several metrics. Such metrics include the duration that title i and title j were interacted with, the separation in time between interacting with title i and title j, the genre similarity between title i and title j, and/or any other technically feasible metric.

Next, noise is added to the global Markov chain to produce the set of Markov chains via the following equation:

$$p_{i,j}[l] = P_{i,j} + Q, Q \sim U(0, \epsilon) \quad \text{(Equation 2)}$$

where $p_{i,j}[l]$ represents Markov chain l, $P_{i,j}$ represents the global Markov chain computed from Equation 1, and Q represents a noise component uniformly distributed noise on the interval [0,epsilon]. In this example, Q follows a uniform distribution, however the exact distribution used to generate the noise values is not critical to the techniques described herein. The personalized model generator 206 may generate any number of Markov chains by repeatedly applying Equation 2. It will be assumed that the personalized model generator 206 creates a total of c Markov chains.

Finally, the rows of each of the c Markov chains are normalized to represent valid transition probabilities via the following equation:

$$p_{i,j}[l] = \frac{p_{i,j}[l]}{\sum_j p_{i,j}[l]} \quad \text{(Equation 3)}$$

thus, each entry of Markov chain l, is normalized by dividing the entry by the sum of the corresponding row. As a result, each row of Markov chain l sums to 1, representing valid transition probabilities.

In another embodiment, the personalized model generator 206 computes the set of Markov chains by focusing on user groups, such as those based on demographics and/or genres. Thus, instead of starting with a global Markov chain and creating randomized offshoots, such as described in Equations 1-3, the personalized model generator 206 first separates the transitions stored in the user interaction database 204 into various user groups. For example, the personalized model generator may identify transitions belonging to children, teens, adults, etc. Then, using the transitions within each individual group, the personalized model generator 206 applies Equation 1 to create a Markov chain for each of the user groups. The personalized model generator 206 may then proceed to block 301 or optionally randomize and normalize each user group's Markov chain via Equation 2 and Equation 3.

In yet another embodiment, the personalized model generator 206 computes the set of Markov chains at random. For example, the value of each entry of the Markov chains may be generated via a uniform distribution, without utilizing the transitions stored in the personalized model generator 206. Afterwards, each of the Markov chains may be normalized according to Equation 3.

Although a number of techniques have been described for initializing the set of Markov chains at block 300, the exact technique employed is not critical. The closer the Markov chains are initialized to transition probabilities representing the underlying stochastic processes of the users, the quicker the personalized model generator 206 may converge on a solution that explains the known user transitions stored in the user interaction database 204. However, regardless of the initial transition probabilities chosen for the set of Markov chains, the personalized model generator 206 will eventually lock onto transition probabilities for the Markov chains that are likely to explain the recorded user transitions better than their initial value. Since the function that is optimized, a likelihood function, when tuning the Markov chain parameters can have multiple maxima, different initial conditions for the Markov chain probabilities can be used to end up with different estimates for these probabilities. In the end the set of parameters that achieves the largest value of the likelihood function being optimized is chosen as the final set of Markov chain parameters for the c Markov chains. In some embodiments, the technique illustrated in FIG. 3 is restarted multiple times with different initial Markov chains selected at block 300 to avoid local maxima.

At block 301 the personalized model generator 206 initializes the mixtures over the c Markov chains for each user. In an embodiment, the mixtures are expressed as an array with c entries, the array representing a probability distribution over the c Markov chains.

For example, the personalized model generator 206 may initialize the mixtures for each user via the following equations, $$\beta_u^0 = \text{Dirichlet}(\alpha^0) \quad \text{(Equation 4)}$$

$$\alpha^0 = [\alpha_1^0, \alpha_2^0, \ldots, \alpha_c^0] \quad \text{(Equation 5)}$$

where $\beta_u^0$ represents the initial mixture for user u over the c Markov chains, a set of c non-negative numbers that add up to 1. The mixture is produced by sampling from a Dirichlet distribution with parameters $\alpha_1^0$ through $\alpha_c^0$, representing a set of c non-negative numbers that add up to 1. The exact values chosen for parameters $\alpha_1^0$ through $\alpha_c^0$ are not critical and may be picked at random. The superscript denotes the iteration to which a variable belongs. Thus, $\alpha^0$ represents the parameters and $\beta_u^0$ represents the mixture for a particular user at initialization, alternatively referred to as iteration 0. Although this particular example utilizes a Dirichlet distribution, other embodiments may utilize a different distribution to initialize the mixtures for each user.

Next, the personalized model generator 206 sets the mean and variance of the per-user Dirichlet distribution via the following, $$\mu_{u,l}^0 = \beta_{u,l}^0 \quad \text{(Equation 5)}$$

$$\sigma_{u,l}^{2^0} = \mu_{u,l}^0(1 - \mu_{u,l}^0) \quad \text{(Equation 6)}$$

where $\mu_{u,l}^0$ represents the mean for user u and Markov chain l and $\sigma_{u,l}^{2^0}$ represents the variance for user u and Markov chain l. In an embodiment, the initial value for the variance is arbitrary but non-zero to initialize the learning algorithm with some healthy amount of variation across users.

At block 302 the personalized model generator 206 updates the per-user Dirichlet posterior parameters for each user. For example, the personalized model generator 206 may update the per-user Dirichlet posterior parameters via the following equations, $$\alpha_{u,l}^{t+1} = \alpha_{j,l}^t + \Sigma_{i,j} \eta_{i,j}^u \gamma_{i,j}^{u,t+1}[l] \quad \text{(Equation 7)}$$

$$\gamma_{i,j}^{u,t+1}[l] = \frac{\mu_{u,l}^t p_{i,j}^t[l]}{\sum_{l'=1}^{c} \mu_{u,l'}^t p_{i,j}^t[l']} \quad \text{(Equation 8)}$$

where, in Equation 7, $\alpha_{u,l}^{t+1}$ represents the parameter for user u and Markov chain l at the current iteration, $\alpha_{u,l}^t$ represents the parameter for user u and Markov chain l at the previous iteration, $\eta_{i,j}^u$ represents the number of transitions recorded in the user interaction database 204 between title i and title j for user u, and $\gamma_{i,j}^{u,t+1}[l]$ represents the current estimate of the probability that transitions from title i to title j for user u come from Markov chain l. $\gamma_{i,j}^{u,t+1}[l]$ is given by Equation 8, where $\mu_{u,l}^t$ represents the mean of the per-user Dirichlet distribution for user u and Markov chain l at the previous iteration, $p_{i,j}^t[l]$ represents Markov chain l at the previous iteration, and $$\sum_{l'=1}^{c} \mu_{u,l'}^t p_{i,j}^t[l']$$

represents the sum of the aforementioned variables over the c Markov chains.

At block 303, the personalized model generator 206 updates the per-user Dirichlet posterior statistics for each user. For example, the personalized model generator 206 may update the Dirichlet posterior statistics via the following equations, $$\mu_{u,l}^{t+1} = \frac{\alpha_{u,l}^{t+1}}{\alpha_{u,T}^{t+1}} \quad \text{(Equation 9)}$$

$$\sigma_{u,l}^{2^{t+1}} = \frac{\alpha_{u,T}^{t+1} - \alpha_{u,l}^{t+1}}{\alpha_{u,T}^{t+1}(\alpha_{u,T}^{t+1} + 1)} \quad \text{(Equation 10)}$$

$$\alpha_{u,T}^{t+1} = \sum_{l=1}^{c} \alpha_{u,l}^{t+1} \quad \text{(Equation 11)}$$

where $\mu_{u,l}^{t+1}$ represents the mean of the per-user Dirichlet distribution for user u and Markov chain l at the current iteration and $\sigma_{u,l}^{2^{t+1}}$ represents the variance of the per-user Dirichlet distribution at the current iteration.

At block 304, the personalized model generator 206 adds the contributions of each user to the current estimate of the global parameters. For example, the personalized model generator 206 may add the user contributions to the current estimate of the global parameters via the following equations, $$X_l = \Sigma_u \mu_{u,l}^{t+1} \quad \text{(Equation 12)}$$

$$Y_l = \Sigma_u (\mu_{u,l}^{t+1})^2 \quad \text{(Equation 13)}$$

$$Z_l = \Sigma_u \sigma_{u,l}^{2^{t+1}} \quad \text{(Equation 14)}$$

$$p_{i,j}^{t+1}[l] = \Sigma_u \eta_{i,j}^u \gamma_{i,j}^{u,t+1}[l] \quad \text{(Equation 15)}$$

where $X_l$, $Y_l$, and $Z_l$ represent variables that store cumulative sums used to estimate statistics across all users for the current iteration and $p_{i,j}^{t+1}[l]$ represents Markov chain l at the current iteration.

At block 305, the personalized model generator 206 computes the population-wide statistics for each Markov chain at the current iteration. For example, the personalized model generator 206 may compute the population-wide statistics for the current iteration via the following equations, $$p_{i,j}^{t+1}[l] = \frac{p_{i,j}^{t+1}[l]}{\sum_{j'} p_{i,j'}^{t+1}[l]} \quad \text{(Equation 16)}$$

$$\mu_l^{t+1} = \frac{1}{N_u} X_l \quad \text{(Equation 17)}$$

$$\sigma_l^{2^{t+1}} = \left(\frac{1}{N_u} Y_l - (\mu_l^{t+1})^2\right) + \frac{1}{N_u} Z_l \quad \text{(Equation 18)}$$

$$\alpha_l^{t+1} = \mu_l^{t+1}\left[\frac{\mu_l^{t+1}(1 - \mu_l^{t+1})}{\sigma_l^{2^{t+1}}} - 1\right] \quad \text{(Equation 19)}$$

Equation 16 normalizes each Markov chain $p_{i,j}^{t+1}[l]$ for the current iteration so that each row sums to 1 and therefore represents valid transition probabilities. Equation 17 computes the population mean $\mu_l^{t+1}$ for chain l, Equation 18 computes the population variance $\sigma_l^{2^{t+1}}$ for chain l and Equation 19 updates the Dirichlet prior parameters $\alpha_l^{t+1}$ for chain l at the current iteration. In Equation 17 and Equation 18 the variable $N_u$ represents the total number of users.

At block 306, the personalized model generator 206 determines whether the stopping condition has been met. For example, the personalized model generator 206 may perform the steps of blocks 302-305 a threshold number of iterations. As another example, the personalized model generator 206 may iterate through blocks 302-305 until the set of Markov chains converges, undergoes less than a threshold degree of change over the current iteration. In the event that the stopping condition has been met, the personalized model generator 206 proceeds to block 306. However, if the stopping condition has not been met, the personalized model generator 206 begins a new iteration by returning to block 302.

At block 307, the personalized model generator 206 generates one or more personalized Markov chains for users of the content browsing and distribution system 100. For example, the personalized model generator 206 may generate a personalized Markov chain for a user via the following equation, $$[P_u]_{i,j} = \Sigma_{l=1}^{c} \mu_{u,l}^{final} p_{i,j}^{final}[l] \quad \text{(Equation 20)}$$

where $[P_u]_{i,j}$ represents the personalized Markov chain for user u, which is obtained by weighting the c Markov chains according to the user's distribution (mixture) $\mu_{u,i}^{final}$ over the c Markov chains. The superscript final denotes the values obtained for the variables at the final iteration just before the stopping condition was met at block 305.

In some embodiments, the steps performed by the personalized model generator 206 at blocks 302 and 303 are multi-threaded or otherwise performed in parallel across the users of the content browsing and distribution system 100. For example, in the case of multithreading, one thread may be created for each user or group of users to speed up performance. The personalized model generator 206 may then combine the result of each thread before computing the population-wide statistics at block 305.

In some embodiments, the personalized model generator 206 may work with only a sample of the users represented within the user interaction database 204. By including fewer users, the personalized model generator 206 less work is required to perform the block diagram of FIG. 3. However, reducing the population size may also reduce the accuracy of the personalized Markov chains generated by the personalized model generator 206. New users not used in the computation can be assigned weights for each of the resulting Markov chains after the initial calibration by using Eq. 7-10 on their corresponding interaction histories.

In some embodiments, the personalized model generator 206 pre-computes the personalized Markov chain for one or more users of the content browsing and distribution system 100. The personalized model generator 206 may then later provide a user's personalized Markov chain upon request from another component, such as the similars generator 208. However, in other embodiments, the personalized model generator 206 may produce the personalized Markov chains by applying Equation 20 with respect to various users as required.

5.0 SIMILARITY COMPUTATION ENGINE FUNCTIONAL OVERVIEW

Figure 4:
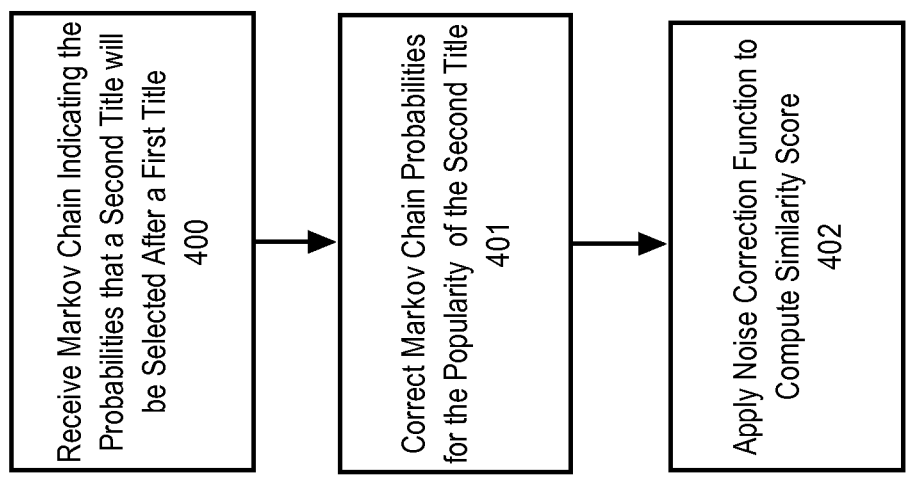
FIG. 4 illustrates, in block diagram form, a similars generator producing measurements of similarity between titles according to an embodiment.

FIG. 4 illustrates, in block diagram form, the similars generator 208 producing measurements of similarity between titles according to an embodiment.

At block 400, the similars generator 208 receives a Markov chain indicating the probabilities that a second title j will be selected after a first title i. In an embodiment, the similars generator 208 receives a personalized Markov chain $[P_u]_{i,j}$ produced by the personalized model generator 206 at block 307 of FIG. 3.

At block 401, the similars generator 208 corrects the probabilities of the Markov chain received at block 400 for popularity of the second title j. One reason that correcting for popularity may produce more accurate similars is that certain titles, such as big blockbuster films, may be watched by almost all users regardless of their usual preferences. Thus, popular titles will often have a close to equal probability of being watched after most titles, regardless of similarity. As a result, similarity measurements derived from observations of users selecting popular titles may be inaccurate. By reducing the impact of such popular titles on the similars, the similars generator 208 may produce more accurate measurements of similarity.

For example, to correct for the popularity of digital content item j the similars generator 208 may apply the following equation, $$OR_{i,j} = \frac{P_i P_{i,j}}{P_i P_j} \quad \text{(Equation 21)}$$

Where $OR_{i,j}$, termed the odds ratio, is the similarity score of title i and title j that is corrected for the popularity of digital content item j, $P_i$ is the probability that title i will be interacted with at random, $P_{i,j}$ is the Markov chain received at block 400, and $P_j$ is the probability that title j will be interacted with at random.

At block 402, the similars generator 208 applies a noise correction function to the odds ratio produced at block 401. For example, to correct for noise from low counts of transitions from title i to title j, the similars generator 208 may apply the following equations, $$COR_{ij} = OR_{ij}\left(1 + \frac{1}{d_j} - 2\sqrt{\mu}\right) \quad \text{(Equation 22)}$$

$$\mu \cong \frac{1}{\eta_{ij}} - \frac{1}{d_i} + \frac{1}{d_j} - \left(\frac{1}{d_j}\right)^2 \quad \text{(Equation 23)}$$

where $COR_{i,j}$ is the corrected odds ratio, the similarity score (similars) between title i and title j that is corrected for popularity of title j and noise $\mu$. Although in this example the noise is given by Equation 23, in other embodiments other technically feasible noise functions may be used.

In some embodiments, the similars generator 208 produces the corrected odds ratio for every pair of titles i and j. For example, the similars generator 208 may pre-compute and store the similars between every title for later use by the recommendation engine 210. In other embodiments, the similars generator 208 may produce the similars for only a portion of the title pairs. For example, the similars generator 208 may receive notice that a user has selected a particular title i from the recommendation engine 210 and in response generate the similars only between the particular title i and the other titles j.

In the embodiment depicted by FIG. 4 the similars generator 208 applies corrections for both popularity and noise to the Markov chain received at block 400. However, in other embodiments, the similars generator 208 may apply a subset of the corrections, or skip blocks 401 and 402 altogether, using the raw Markov chain received at block 400 as the similars.

6.0 RECOMMENDATION ENGINE FUNCTIONAL OVERVIEW

Figure 5:
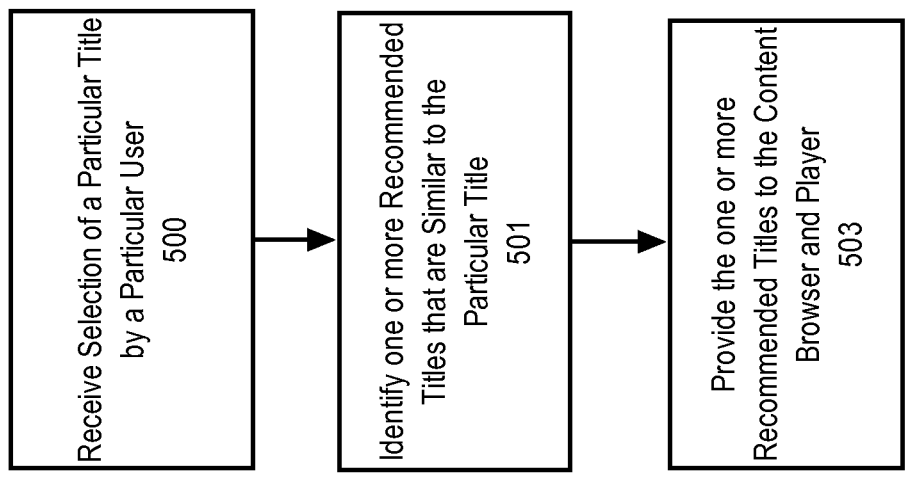
FIG. 5 illustrates, in block diagram form, a recommendation engine 210 providing title recommendations according to an embodiment.

FIG. 5 illustrates a block diagram of the recommendation engine 210 providing title recommendations according to an embodiment.

At block 500, the recommendation engine 210 receives input indicating selection of a particular title by a particular user. In an embodiment, the CBP 108 provides a user interface to a user of the content browsing and distribution system 100 through which the user may select a title. In response to receiving a title selection from the user, the CBP 108 sends a message to the web application server 102 indicating the user's title selection. The web application server 102 then provides the selected title and the user to the recommendation engine 210.

At block 501, the recommendation engine 210 identifies one or more recommended titles that are similar to the particular title. In an embodiment, the recommendation engine 210 provides the particular title and the user to the similars generator 208. The similars generator 208, in response, computes the similars for the particular title based on the user's personalized Markov chain and returns the results to the recommendation engine 210. The recommendation engine 210 then selects one or more recommended titles based on the similars received from the similars generator 208. For example, the recommendation engine 210 may select the N titles that have the highest similars to title i. As another example, the recommendation engine 210 may select recommended titles that have similars to title i that are above a particular threshold.

At block 502, the recommendation engine 210 provides the one or more recommended titles identified at block 501 to the CBP 108. In an embodiment, the recommendation engine 210 sends one or more messages to the CBP 108 over the communications network 104 specifying the one or more titles. The CBP 108, in response to receiving the one or more recommended titles from the recommendation engine 210 displays the recommended titles to the user.

Each of the processes shown in FIG. 3, FIG. 4, FIG. 5 may be implemented, in various embodiments, using one or more computer programs, other software elements, firmware, or a combination thereof that are hosted in or executed by a general-purpose computer. Alternatively, web application server 102 may be configured as a special-purpose computer in which the processes of FIG. 3, FIG. 4, FIG. 5 using special-purpose logic.

7.0 TITLE RECOMMENDATION DISPLAY

Figure 6:
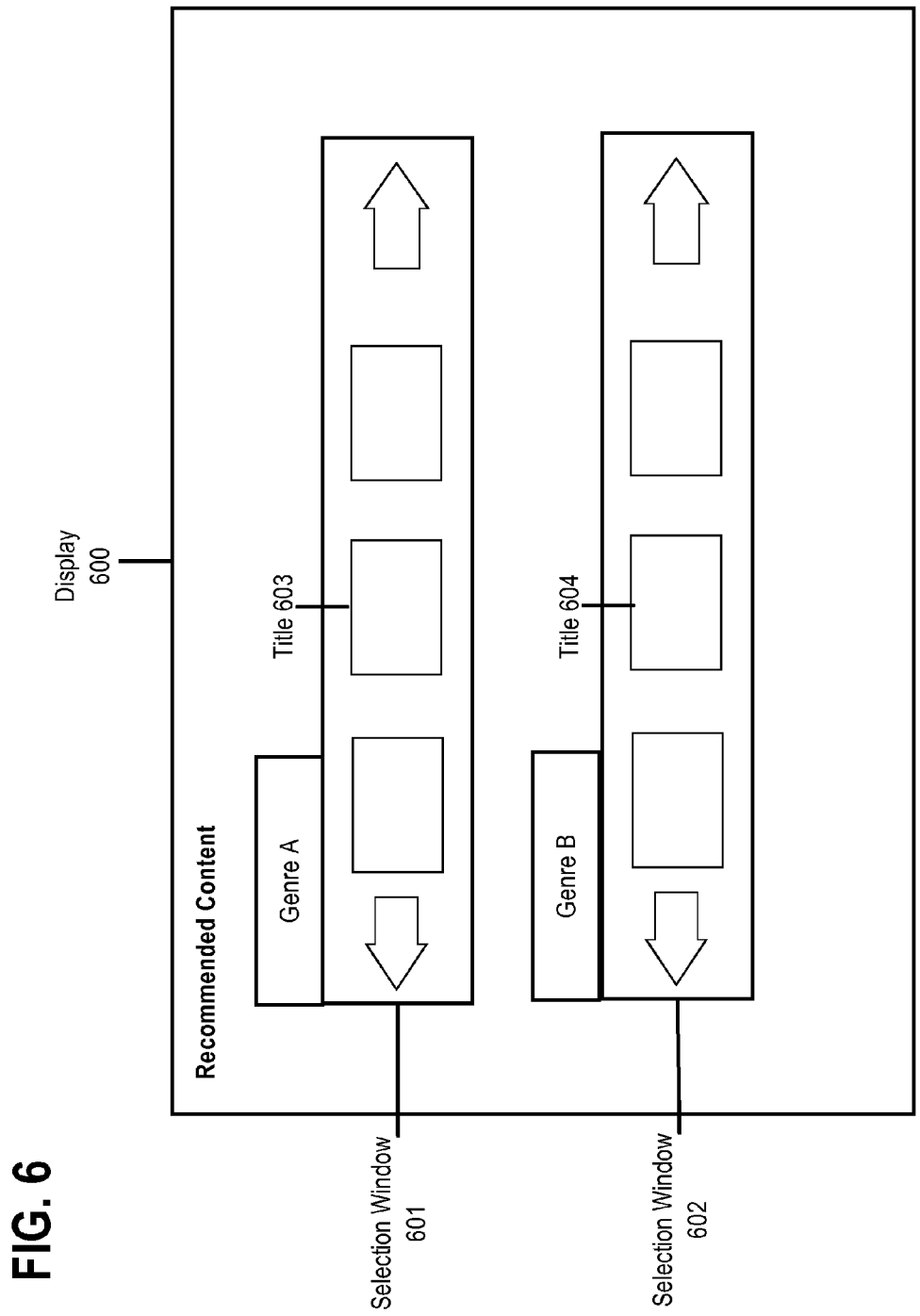
FIG. 6 illustrates an example menu for displaying the one or more recommended titles according to an embodiment.

FIG. 6 illustrates an example menu for displaying the one or more titles recommended by the recommendation engine 210 according to an embodiment. In FIG. 6, display 600 includes selection window 601 and selection window 602 associated with genre A and B respectively. Title 603 is included within selection window 601 and title 604 is included within selection window 602. Although only a particular number of each element is depicted in FIG. 6, a practical environment may have more or less of each of the aforementioned elements. For example, the display 600 may include hundreds of selection windows, each corresponding to a different genre or theme. As another example, the display 600 may include only a single selection window containing all recommended titles.

In an embodiment, the CBP 108 sorts the one or more titles received from the recommendation engine 210 at block 502 of FIG. 5. The CBP 108 may sort the one or more titles by genre or any other applicable theme. The CBP 108 then displays the one or more titles in windows, such as selection window 601 and selection window 602, corresponding to the genres/themes. In some embodiments, the CBP 108 is configured to allow the user to browse and select titles within each category via the selection windows. For example, should the user select title 603 the CBP 108 may begin playback of title 603. As another example, title 603 may be presented in the vicinity of one or more options for displaying ratings associated with the title 603, viewing detailed information related to the title 603, adding the title 603 to a queue, submitting a rating for title 603, etc.

In some embodiments, the CBP 108 provides the display 600 at times when the user may be likely to select a new title for playback or in response to certain user-initiated events. For example, the CBP 108 after the user has selected a title may begin playback of the title for the user. Once the CBP 108 has finished playback of the title, the CBP 108 may provide display 600 to guide the user to titles similar to the title the user had just selected. As another example, the CBP 108 may provide, in the vicinity of titles that are available for playback, an option for displaying similar titles. When the option is selected by a user, the CBP 108 provides display 600 to guide the user to similar titles.

8.0 OPTIMIZING COMPUTATION OF SIMILARS

In some cases, the number of users of the content browsing and distribution system 100 may be extremely large, potentially tens or hundreds of millions of users. As a result, the amount of computational time required for the similars generator 208 to produce similars from every user's personalized Markov chain may be infeasible in cases where resources are limited. Thus, the similars generator 208 may instead opt to estimate the similars for the personalized Markov chain $[P_u]_{i,j}$ based on the similars of the c Markov chains $p_{i,j}^{final}[l]$.

In an embodiment, the similars generator 208 computes the similars $COR_{i,j}[l]$ for each of the c Markov chains $p_{i,j}^{final}[l]$ via Equations 21-23. The similars generator 208 may pre-compute the similars $COR_{i,j}[l]$ or produce the similars $COR_{i,j}[l]$ as required.

To generate similars for a particular user u, the similars generator 208 weighs the similars $COR_{i,j}[l]$ of each Markov chain $p_{i,j}^{final}[l]$ in accordance with user u's mixture $\mu_{u,i}^{final}$ via the following equation, $$COR_{i,j}^{u} = \Sigma_{l=1}^{c} \mu_{u,i}^{final} COR_{i,j}[l] \qquad \text{(Equation 24)},$$

where $COR_{i,j}^{u}$ represents the estimated similars for user u. In other embodiments, the similars generator 208 utilizes other similarity metrics between any two titles for each of the c Markov chains, and then creates personalized similarity metrics by taking the corresponding weighted average of each of the c similarity metrics using $\mu_{u,i}^{final}$ as the weights. As a result, the similars generator 208 applies Equations 21-23 for each of the c Markov chains, rather than for the entire population of users. In addition, in such embodiments, the personalized model generator 206 may skip producing the personalized Markov chains $[P_u]_{i,j}$ at block 307 of FIG. 3, instead providing the c Markov chains $p_{i,j}^{final}[l]$ and the user mixtures $\mu_{u,i}^{final}$ to the similars generator 208 after reaching the stopping condition at block 306 of FIG. 3.

9.0 ALTERNATIVE CONTEXTS AND USES

Thus far, the techniques described above have been explained primarily in the context of recommending titles for a digital content distribution system. Specifically, the techniques described herein posit that each user's title selection process can be represented by a mixture of c Markov chains and that each user's transition from title i to title j is attributable to one of the Markov chains. Then, working backwards from available transition data, the personalized model generator 206 discovers the c Markov chains and the mixture for each user. The c Markov chains along with the per-user mixture then provide the building blocks for a Markov chain tailored to a particular user's title selection process. However, the same model may be applied to many different systems in many different contexts.

For example, in order to recommend products for purchase, a product recommendation system may represent each user's product purchase process as a mixture of c Markov chains where each user's transition from purchasing product i to purchasing product j is attributable to one of the user's c Markov chains. By following the techniques described herein, the product recommendation system can locate similar products to recommend given the user's last purchase.

As another example, to model documents, a document modeler may represent each document as mixture of c Markov chains where each transition from word i to word j in the document is attributed to one of the document's c Markov chains. Using the techniques above, the document modeler can discover the mixture of Markov chains that represents each of the documents. In cases where each of the c Markov chains represents the word transitions of a particular topic, discovering the mixture of Markov chains also serves to identify the subject matter of the documents.

In the abstract, as long as the system being modeled can be expressed as variables that draw from a mixture of a set number of Markov chains to transition between states, the techniques described herein may be applied to discover a statistical model, the personalized Markov chain, tailored to predict a particular variable's transitions provided that a recorded collection of variable transitions is available.

10.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
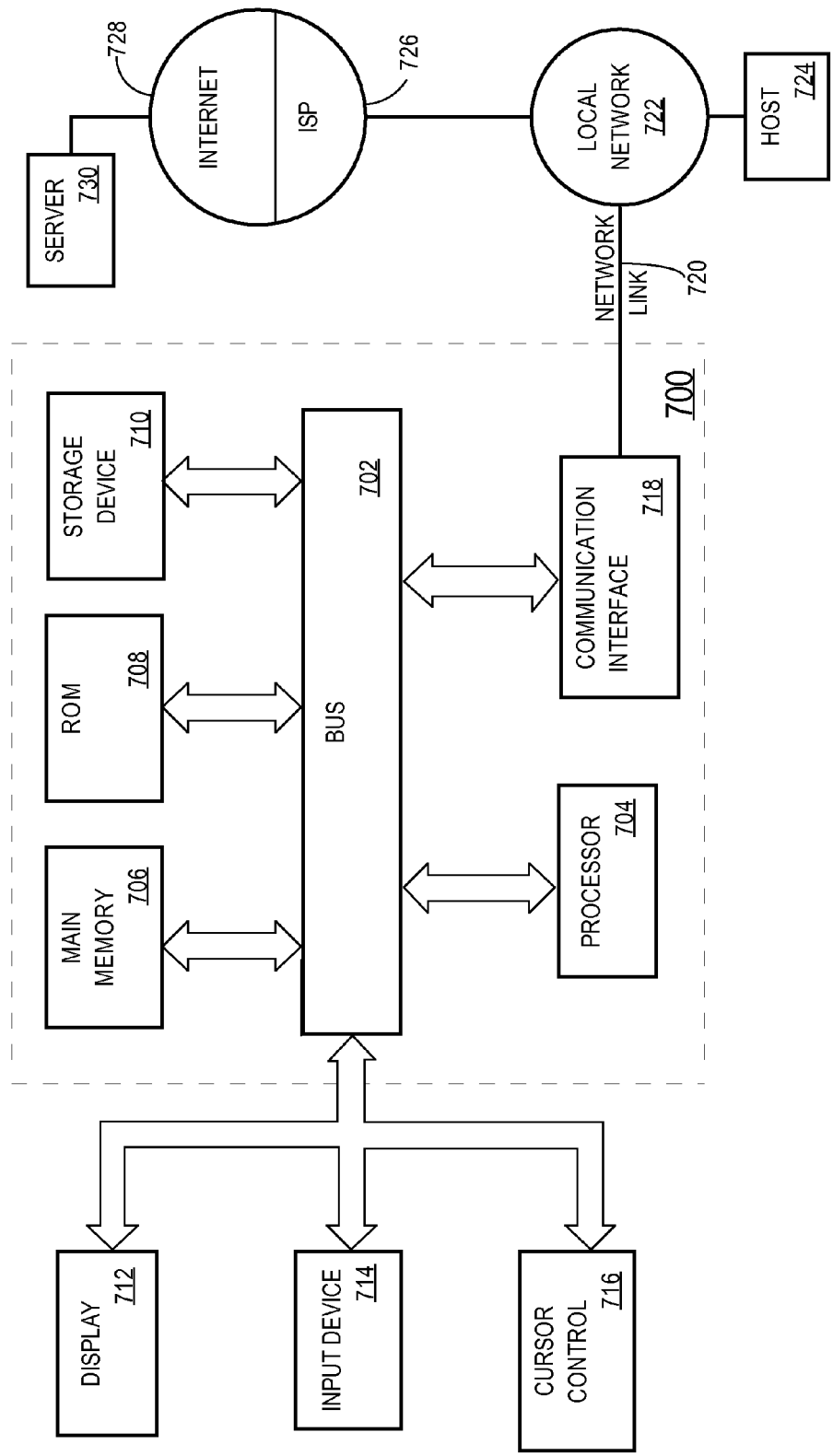
FIG. 7 is a block diagram that illustrates a computer system 700 upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

11.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving title interaction data, wherein the title interaction data specifies, for each user of a plurality of users, an order in which the user interacted with a plurality of titles;
    generating a plurality of statistical models, each statistical model of the plurality of statistical models specifying a plurality of probabilities, wherein the plurality of probabilities represent, for each first title of the plurality of titles and each second title of the plurality of titles, a likelihood that a user will interact with the first title then next interact with the second title;
    wherein generating the plurality of statistical models is performed by creating a global statistical model based on the title interaction data and applying noise to the global statistical model to create each of the plurality of statistical models;
    refining the plurality of statistical models based on the title interaction data to produce a plurality of refined statistical models;
    determining a plurality of weight values corresponding to the plurality of refined statistical models for a particular user of the plurality of users, wherein each weight value of the plurality of weight values corresponds to a respective refined statistical model of the plurality of refined statistical models;
    identifying, for the particular user, one or more recommended titles of the plurality of titles based on the plurality of weight values and the plurality of refined statistical models;
    wherein the method is performed by one or more computing devices.

2. The method of claim 1, wherein each statistical model of the plurality of statistical models is a Markov chain.

3. The method of claim 1, wherein the plurality of titles represent digital content items that are available for download from a content distribution network.

4. The method of claim 1, further comprising combining the plurality of statistical models in accordance with the plurality of weight values to create a personalized statistical model for the particular user.

5. The method of claim 1, wherein the step of refining is performed iteratively until a stopping condition has been reached, wherein the stopping condition is one or more of:
    a threshold number of iterations has been performed, or
    the plurality of statistical models have undergone less than a threshold amount of change during an iteration.

6. The method of claim 1, further comprising determining, for the particular user, one or more measurements of similarity between titles of the plurality of titles based on the plurality of statistical models and the plurality of weight values, wherein the recommended titles are identified based on the one or more measurements of similarity.

7. The method of claim 6, wherein determining the one or more measurements of similarity involves determining a set of similarity measurements for each of the plurality of statistical models and combining the set of similarity measurements for each of the plurality of statistical models in accordance with the plurality of weight values.

8. The method of claim 6, further comprising correcting the one or more measurements of similarity for one or more of title popularity or noise.

9. The method of claim 1, further comprising receiving data indicating that the particular user has currently interacted with a particular title of the plurality of titles, wherein the one or more recommended titles are identified based, at least in part, on the particular title.

10. A non-transitory computer-readable medium storing one or more instructions which, when executed by one or more processors, cause the one or more processors to perform steps comprising:

receiving title interaction data, wherein the title interaction data specifies, for each user of a plurality of users, an order in which the user interacted with a plurality of titles;

generating a plurality of statistical models, each statistical model of the plurality of statistical models specifying a plurality of probabilities, wherein the plurality of probabilities represent, for each first title of the plurality of titles and each second title of the plurality of titles, a likelihood that a user will interact with the first title then next interact with the second title;

wherein generating the plurality of statistical models is performed by creating a global statistical model based on the title interaction data and applying noise to the global statistical model to create each of the plurality of statistical models;

refining the plurality of statistical models based on the title interaction data to produce a plurality of refined statistical models;

determining a plurality of weight values corresponding to the plurality of refined statistical models for a particular user of the plurality of users, wherein each weight value of the plurality of weight values corresponds to a respective refined statistical model of the plurality of refined statistical models;

identifying, for the particular user, one or more recommended titles of the plurality of titles based on the plurality of weight values and the plurality of refined statistical models.

11. The non-transitory computer-readable medium of claim 10, wherein each statistical model of the plurality of statistical models is a Markov chain.

12. The non-transitory computer-readable medium of claim 10, wherein the plurality of titles represent digital content items that are available for download from a content distribution network.

13. The non-transitory computer-readable medium of claim 10, wherein the steps further comprise combining the plurality of statistical models in accordance with the plurality of weight values to create a personalized statistical model for the particular user.

14. The non-transitory computer-readable medium of claim 10, wherein the step of refining is performed iteratively until a stopping condition has been reached, wherein the stopping condition is one or more of:

a threshold number of iterations has been performed, or the plurality of statistical models have undergone less than a threshold amount of change during an iteration.

15. The non-transitory computer-readable medium of claim 10, wherein the steps further comprise determining, for the particular user, one or more measurements of similarity between titles of the plurality of titles based on the plurality of statistical models and the plurality of weight values, wherein the recommended titles are identified based on the one or more measurements of similarity.

16. The non-transitory computer-readable medium of claim 15, wherein determining the one or more measurements of similarity involves determining a set of similarity measurements for each of the plurality of statistical models and combining the set of similarity measurements for each of the plurality of statistical models in accordance with the plurality of weight values.

17. The non-transitory computer-readable medium of claim 15, further comprising correcting the one or more measurements of similarity for one or more of title popularity or noise.

18. The non-transitory computer-readable medium of claim 10, wherein the steps further comprise receiving data indicating that the particular user has currently interacted with a particular title of the plurality of titles, wherein the one or more recommended titles are identified based, at least in part, on the particular title.

* * * * *